J. G. BUZZELL.
Carriage-Wheel.
No. 69,403.
Patented Oct. 1, 1867.
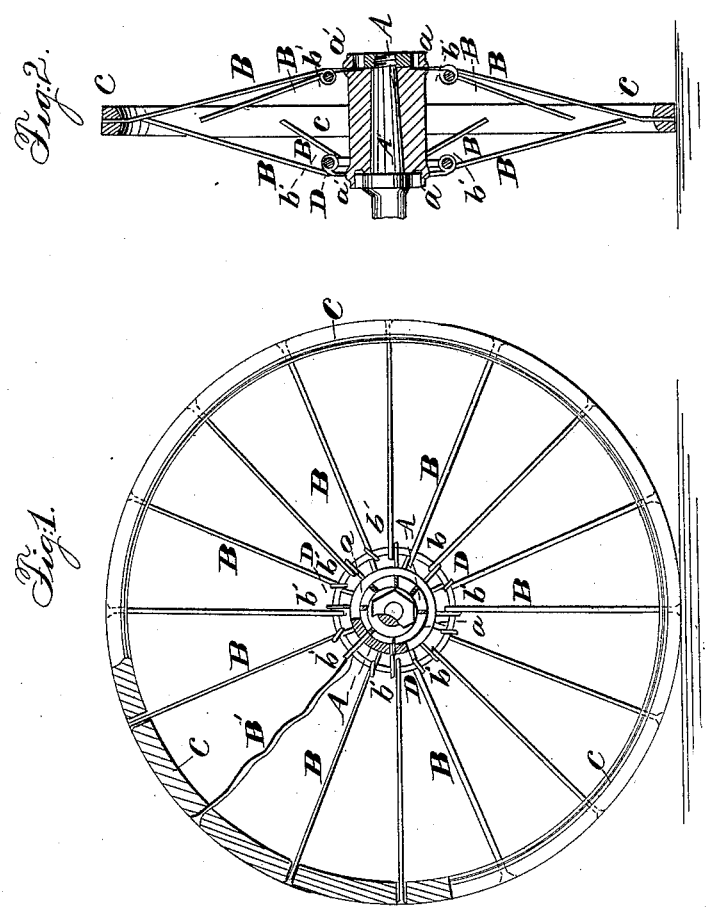

UNITED STATES PATENT OFFICE.

JOHN G. BUZZELL, OF LYNN, MASSACHUSETTS.

IMPROVEMENT IN CARRIAGE-WHEELS.

Specification forming part of Letters Patent No. 69,403, dated October 1, 1867.

*To all whom it may concern:*

Be it known that I, JOHN G. BUZZELL, of Lynn, in the county of Essex and State of Massachusetts, have invented a new and useful Improvement in Carriage-Wheels; and I do hereby declare that the following is a full, clear, and exact description thereof, which will enable others skilled in the art to make and use the same, reference being had to the accompanying drawings, forming part of this specification, in which—

Figure 1 is a side view of my improved wheel, part of the rim and hub being broken away to show the construction. Fig. 2 is a central cross-section of the same.

Similar letters of reference indicate corresponding parts.

My invention has for its object to furnish an improved carriage-wheel, light, simple, strong, and elastic, and which can be readily tightened or strained whenever desired; and it consists in forming coils in the wire spokes of the wheel to give them the necessary elasticity, in the combination of the open ring with the coils of the wire spokes, and in crimping the spokes to give them elasticity.

A is the hub of the wheel, which is made with flanges $a'$ upon each end, projecting outward longitudinally with the hub, as shown in Fig. 2. These flanges $a'$ may be a solid part of the hub, or they may be bands placed upon the ends of the hub and firmly secured in their places.

B are the spokes, which are made of wire or small metallic rods, and upon the inner ends of which are cut screw-threads, as shown in the drawings. The wire spokes are secured to the hub A by being screwed into holes formed in the flanges $a'$ of the said hub A, one spoke being screwed into one end of the hub and the next spoke being screwed into the other end of the said hub, as shown in Fig. 2. The outer ends of the spokes B are swiveled to the rim C of the wheel by having heads formed upon their ends, which fit into the countersunk ends of the holes through the rim C, as shown in Figs. 1 and 2. This construction enables the strain of the wheel to be regulated by turning the spokes B. In the spokes B, at any desired distance from the hub A, is formed a coil, $b'$, to act as a spring in giving elasticity to the wheel.

D is an open ring, made of wood or other hard material, which is passed through the coils $b'$ in the wire spokes B, so as to prevent the said coils from closing up, and also to enable the elasticity of the wheel to be regulated. The use of the open rings D is not absolutely essential; but I prefer to use them, as improving the elasticity and durability of the wheel.

The spokes B, instead of having coils $b'$ formed upon them, may be crimped, as shown at B′, Fig. 1, to give them the desired elasticity; or they may be crimped and also have the coils $b'$ formed in them, if thought advisable.

By removing the open ring D, when used, and turning the spokes B, the tightness or strain of the wheel may be regulated at pleasure.

What I claim as new, and desire to secure by Letters Patent, is—

1. The swiveled spokes B′, when crimped to give them elasticity, with the coils $b'$, substantially as herein shown and described.

2. The single spokes B, their outer end swiveled to the rim C, and their ends screwing into the hub and adapted to be turned to regulate the strain of the wheel, as herein set forth, for the purpose specified.

3. The single spokes B or B′, their inner ends secured to the hub A out of the same horizontal lines with the coils $b'$, as herein set forth, for the purpose specified.

4. The combination and arrangement of the removable ring D, coiled swiveled spokes B B′, whereby the strain and elasticity of the wheel is adjusted, as herein set forth, for the purpose specified.

JOHN G. BUZZELL.

Witnesses:
GEO. C. TODD,
GEO. FLYNN.